March 6, 1956
C. A. JOHNSON ET AL
2,737,129
APPARATUS FOR MEASURING AND INTRODUCING
DRY INGREDIENTS INTO PROCESSING
MACHINES USING LIQUID THEREIN
Filed June 25, 1952
3 Sheets-Sheet 1
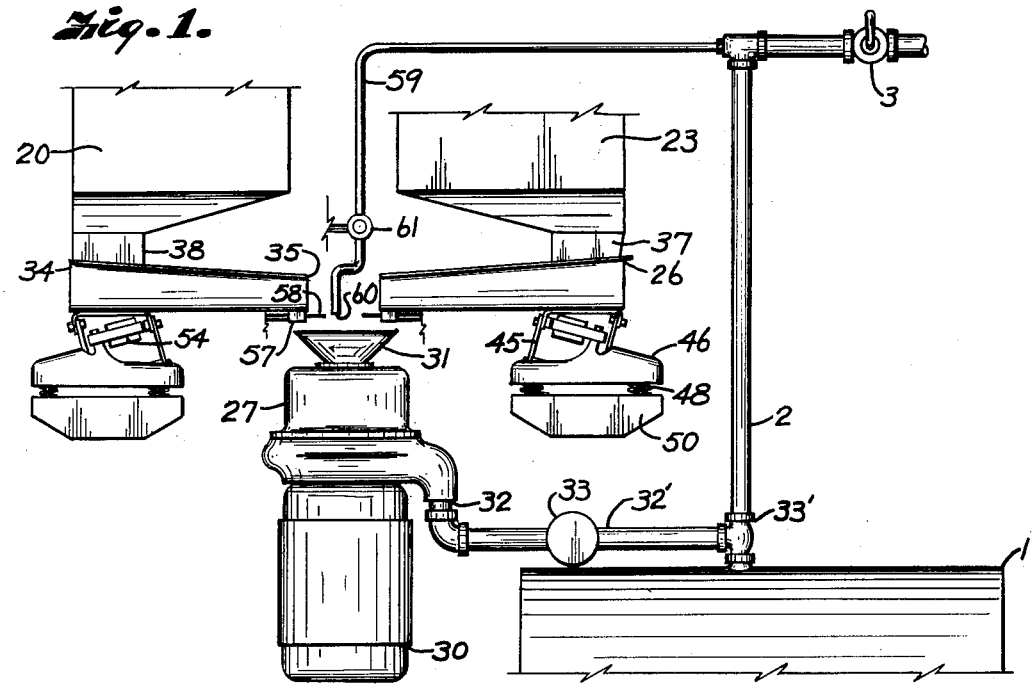
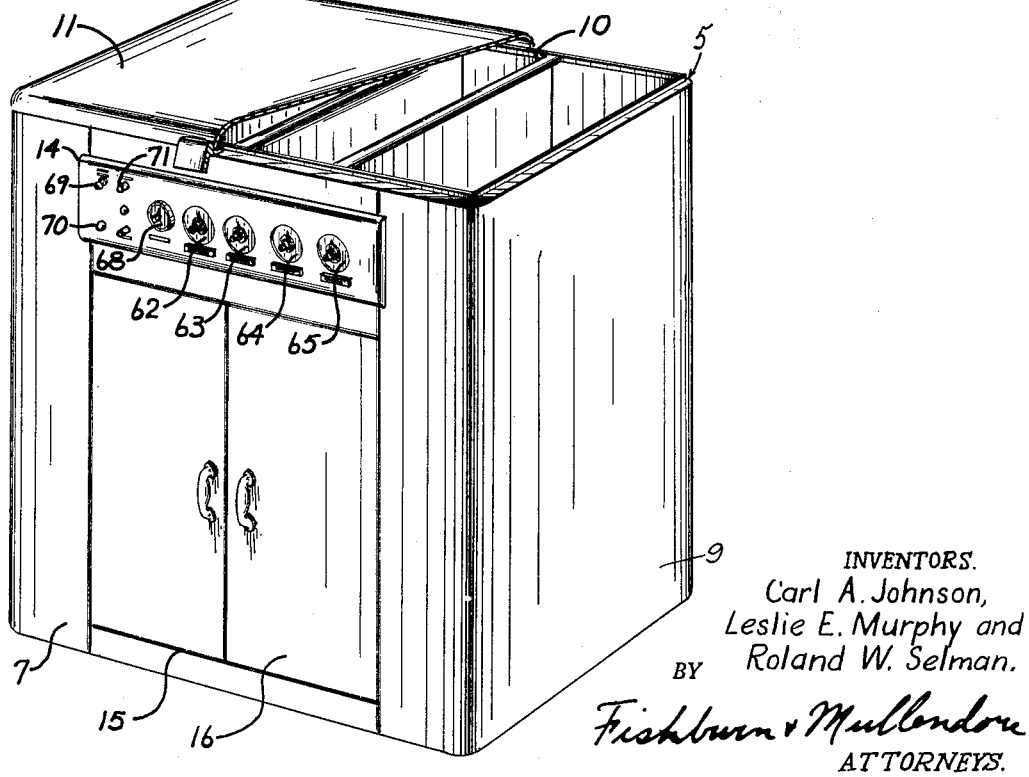
INVENTORS.
Carl A. Johnson,
Leslie E. Murphy and
Roland W. Selman.
BY
Fishburn & Mullendore
ATTORNEYS.

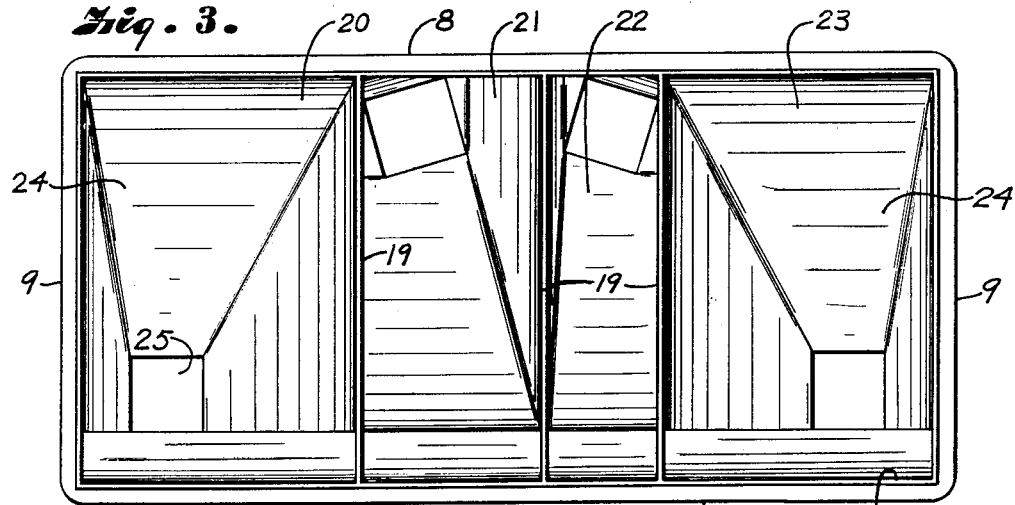
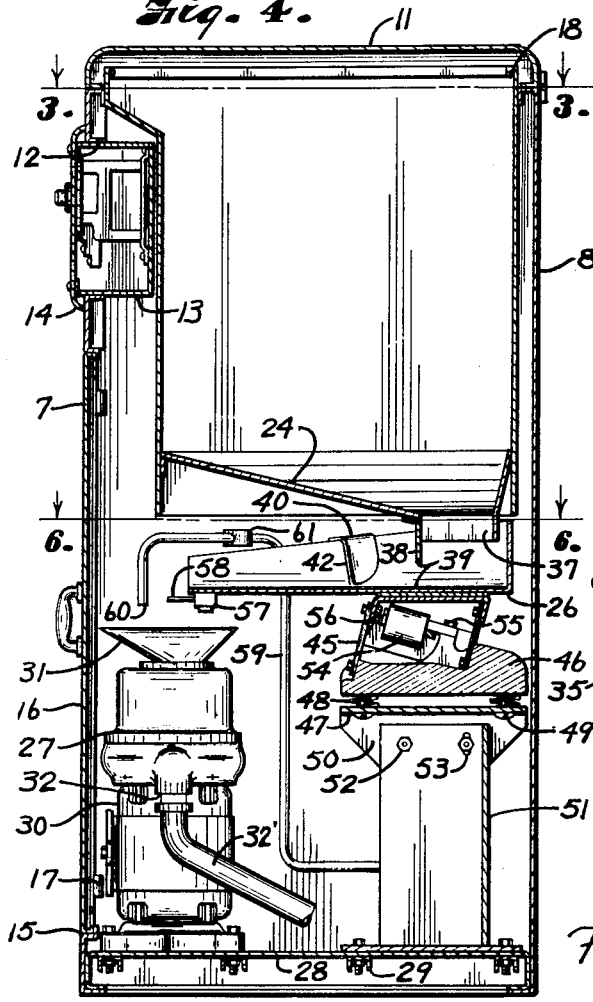
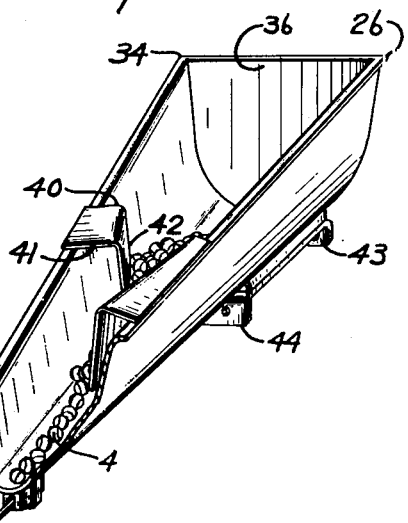
INVENTORS.
Carl A. Johnson,
Leslie E. Murphy and
BY Roland W. Selman.
ATTORNEYS.

March 6, 1956

C. A. JOHNSON ET AL 2,737,129

APPARATUS FOR MEASURING AND INTRODUCING
DRY INGREDIENTS INTO PROCESSING
MACHINES USING LIQUID THEREIN

Filed June 25, 1952

INVENTORS.
Carl A. Johnson,
Leslie E. Murphy and
BY    Roland W. Selman.

Fishburn & Mullendore
ATTORNEYS.

United States Patent Office 2,737,129
Patented Mar. 6, 1956

2,737,129

APPARATUS FOR MEASURING AND INTRODUCING DRY INGREDIENTS INTO PROCESSING MACHINES USING LIQUID THEREIN

Carl A. Johnson, Overland Park, and Leslie E. Murphy, Mission, Kans., and Roland W. Selman, Kansas City, Mo., assignors to Pelbake Corporation, Kansas City, Mo., a corporation of Missouri Application June 25, 1952, Serial No. 295,538

5 Claims. (Cl. 107—4)

This invention relates to an apparatus for measuring and introducing dry ingredients into processing machines using liquid therein, and more particularly to the counting and dispensing of ingredient units or pellets into a grinder through which a portion of needed liquid is passed to carry ground ingredients to the processing machine.

It is usual practice in introducing dry ingredients into processing machines, such as dough mixing machines and the like where liquid is used in the process, to measure various ingredients in bulk and deliver them separately to the machine, the measuring, weighing, or other determination of the quantity of material being done by a workman and subject to inaccuracies unless care is used. In other processes, for example in laundry washing machines, dry soap or other chemicals are measured and introduced manually into the machines. The present invention is adaptable for introducing dry materials and ingredients into machines of any type wherein liquid is used in the processing, and by way of example only will be described herein in connection with the mixing of dough for use in bakeries and the like.

The present invention contemplates the placing of flour and the like in a dough mixer in the usual manner and the formation of other ingredients in compressed, pellet form, whereby each pellet is of desired size, shape or weight containing a known unit of the ingredient. The required amount of an ingredient is calculated and specified in terms of number of pellets, which are counted and delivered to a grinder with a portion of needed liquid, the grinder reducing the pellets and mixing them into the liquid which carries the ground ingredients to the processing machine. The grinding of the pellets in the liquid also facilitates the ingredients being dissolved in the liquid, thereby aiding in the dispersal of the ingredients throughout the mix in the processing machine.

The objects of the present invention are to provide for introducing dry ingredients into a mixing machine or the like by counting a desired number of unit size pellets, delivering them with a stream of liquid into a grinder which pulverizes said pellets, and delivering the liquid and ground ingredients into the mixing machine or the like; to provide in combination with a processing machine, such as dough mixer having a source of liquid supply, ingredient pellet metering and dispensing mechanism which delivers the required pellets to a grinder and a liquid bypass which delivers a portion of the needed liquid to the grinder, said grinder pulverizing the pellets and mixing same in the liquid and delivering the mix to the processing machine; to provide a pellet supply and vibrating chute for effecting delivery of pellets one at a time and dropping same during vibration of the chute, and a pellet counting and control apparatus actuated by the dropping pellets for stopping the vibration of the chute when a desired quantity of pellets is delivered; to provide one or more baffles in the vibrating chute for maintaining the pellets in a line at the discharge end of the chute; to provide control apparatus, including electrical devices, on which desired quantities of pellets are set, which devices are energized in response to closing of switches by dropping pellets to return the devices to zero position, which interrupts and stops a chute vibrating mechanism; to provide pellet containing hoppers for gravity feed into the vibrating chutes; and to provide improved elements and arrangements of elements in our apparatus.

In accomplishing these and other objects of the present invention, we have provided improved details of structure, the preferred forms of which are illustrated in the accompanying drawings, wherein:

Fig. 1 is a diagrammatic view of the apparatus for counting and dispensing pellets of ingredients, and grinding and delivering the ground ingredients with liquid to a mixer or the like.

Fig. 2 is a perspective view of the pellet apparatus, portions of the cover being broken away to illustrate the arrangement of pellet hoppers.

Fig. 3 is a plan view of the pellet apparatus with the cover removed.

Fig. 4 is a vertical sectional view through the pellet apparatus.

Fig. 5 is a perspective view of the pellet chute, with a portion broken away to illustrate the line of pellets adjacent the discharge end.

Figure 6:
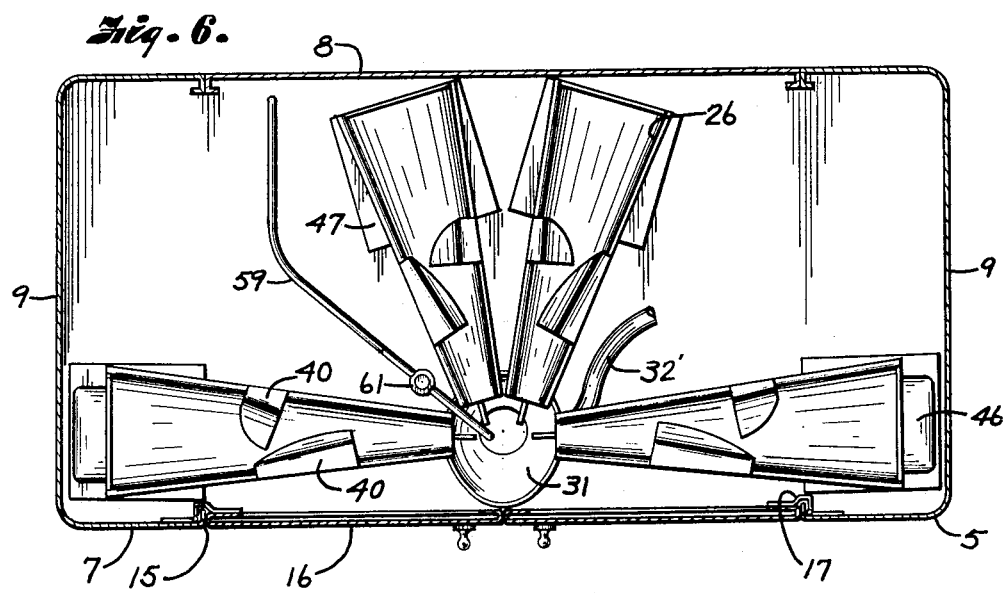
Fig. 6 is a horizontal sectional view through the pellet apparatus on the line 6—6, Fig. 4.
Figure 7:
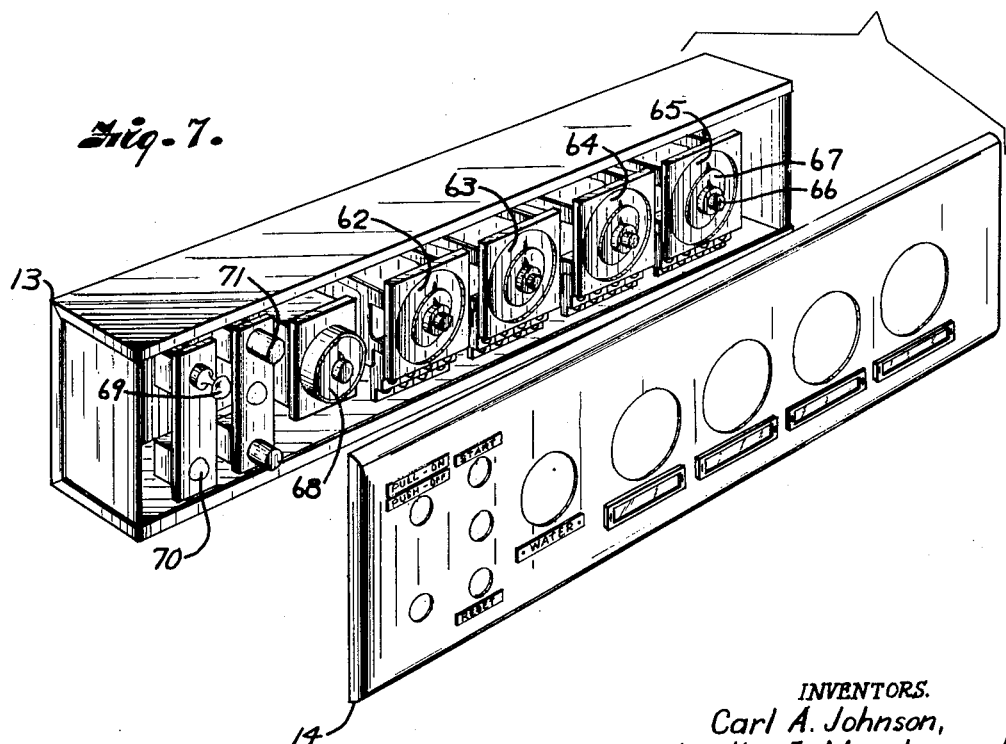
Fig. 7 is a disassembled, perspective view of the pellet apparatus controls.

Referring more in detail to the drawings:

1 designates a processing machine such as a dough mixer or the like, into which dry ingredients and liquid are normally introduced. A liquid feed pipe 2 connected to a suitable source of hot or cold liquid supply communicates with the interior of the dough mixer 1 and is controlled by a valve 3 to provide needed liquid for the processing. In the processing of dough, a suitable amount of flour is placed in the mixer 1 and other ingredients, each of which is compressed into a plurality of pellets 4 of desired unit size or weight and preferably of a generally spherical contour for rolling, are arranged in a pellet apparatus 5 which includes controls and mechanism for metering the desired ingredient pellets and effecting introduction of the same to the processing machine 1.

In the illustrated embodiment of the pellet apparatus 5 there is a housing 6, having a front wall 7, back wall 8, end walls 9 and an open top 10 which is closed by a cover 11 suitably hinged on the back wall 8. The upper portion of the front wall 7 is provided with an elongated opening 12, in which is mounted a box 13 for enclosing a plurality of controls as later described, the front portion of the box 13 being closed with an instrument panel 14 suitably mounted thereon. The front wall 7 is also provided with an opening 15 providing access to the interior of the housing 6, said opening 15 being closed by doors 16 mounted on the front wall 7 by suitable hinges 17.

A hopper structure 18 is mounted in the upper portion of the housing 6 with the upper portions of the front, rear and end walls thereof substantially engaging the walls of the housing defining the open top 10. The hopper structure is provided with a plurality of spaced, transverse walls or partitions 19, dividing the structure 18 into a plurality of hoppers or bins 20, 21, 22 and 23 of desired capacity. While four hoppers are illustrated, it is obvious that any desired number may be arranged and/or grouped in the structure with the relative sizes thereof approximately proportioned to the quantities of the respective ingredients which will be needed in the processing machine 1. Each of the hoppers is provided with bottoms 24 which are suitably secured to the side and end walls of the respective hoppers, and slope downwardly therefrom to the respective discharge openings 25 which are arranged in the most advantageous position for positioning pellet chutes 26 in the housing for receiving the pellets from the hoppers and effecting delivery of same to a grinder 27. In the illustrated structure, the housing is provided with a floor 28 suitably reinforced by structural members 29 for supporting the weight of required operating structures.

The grinder 27 is of the vertical type driven by a motor 30 and is mounted on the floor 28 at the longitudinal center of the housing and adjacent the opening 15 in the front wall 7, said grinder being provided with a funnel-shaped inlet member 31 and an outlet connection 32 which is connected by a pipe or duct 32' with the mixer 1. The grinder may be of any suitable type that will effect comminution of the pellets, for example, a satisfactory grinder is a conventional garbage disposer having a cylindrical wall with internal serrations and a rotor which moves the material in contact with the serrations, the spacing between the rotor and wall limiting the size of particles that will pass to the outlet connection 32. As illustrated in Fig. 1, a pump 33 is arranged in the pipe 32' and said pipe or pump discharge is connected by a T fitting 33' to the pipe 2 adjacent the mixer 1, whereby the discharge from the grinder is forced by the pump 33 into the liquid in the pipe 2 against the pressure thereof and said discharge and liquid enter the mixer 1 together.

Each of the pellet chutes 26 is an open-topped, trough-shaped member with an end 34 wider than the end 35, the end 34 being closed by a wall 36 and the end 35 being open for discharge of the pellets therefrom. The bottoms of the troughs are rounded, substantially semiconical in shape, whereby the pellets tend to gravitate to the longitudinal center of the bottom. The wider portion of the chutes 26 is positioned under the discharge openings 25 of the respective hoppers and is wider than said openings to assure the pellets gravitate from the hopper into the chute. Also the openings 25 are preferably surrounded by a depending flange 37 which extends downwardly into the chute to prevent the quantity of pellets in the wide portion of the chute building up higher than the sides thereof. A forward portion 38 of the flange 37, that is the portion toward the open end 35 of the chute, extends downwardly whereby the spacing 39 from the lower end thereof and the bottom of the chute is less than twice the diameter of the pellets, whereby said portion forms a pellet retarder that prevents more than one layer of pellets moving toward the discharge end of the chute.

Each of the chutes is also provided with one or more angle-shaped members 40 staggered along the length of the chute and having one leg 41 suitably secured to the sides of the chute and the other leg 42 extending downwardly into the chute at an angle to the sides thereof to form baffles arranged relative to the chute whereby a single line of pellets approaches the open end thereof. The baffles in the illustrated structure are staggered and positioned on opposite sides of the longitudinal center of the chute and are laterally spaced to form a gate which limits the movement of pellets toward the open end 35 to a single row, as illustrated in Fig. 5.

Each of the chutes is so arranged in the housing 6 relative to the respective hoppers and the funnel-shaped inlet 31 of the grinder whereby the open end 35 is positioned over the funnel-shaped inlet 31 to discharge the pellets therein. Each of the chutes is resiliently mounted for vibration, said chutes being provided with brackets 43 having longitudinally spaced, depending flanges 44, each of which is suitably secured to the upper ends of flat leaf springs 45, the lower ends of said leaf springs being suitably secured to a block 46, preferably of relatively heavy mass. Each of the springs 45 preferably slopes downwardly and toward the grinder.

The blocks 46 are positioned over plates 47 with resilient members, such as coil springs 48, arranged therebetween, screws 49 or the like connecting the block to the plate to adjust the compression of the springs 48 and limit separation of the block and plate. The plates 47 are each provided with depending flanges 50 which are secured to the upper ends of channel-shaped columns 51, the lower ends of said columns being suitably secured to the floor 28. The flanges 50 are preferably connected to the columns by suitable bolts 52, one of the bolts extending through a slot 53 in each column and the other bolts extending through aligned apertures to form pivots for the plates 47, whereby loosening of the bolts extending through the slots 53 permits the plates 47 to be tilted to adjust the slope of the bottom of the respective chute, said bolts being tightened when the slope of the respective chute is such that the pellets will roll out the open end of the chute when said chute is vibrated, but will not move toward the open end 35 when the chute is stationary.

Vibration of the individual chutes is effected by electromagnets 54 arranged between springs 45 and rigidly secured to the blocks 46 by fastening devices 55. One end of each magnet is positioned adjacent strips of metal 56 suitably secured to one of the depending flanges 44 on the brackets 43 whereby energization of the magnets 54 will attract the strips 56 toward the magnets, bending the flat springs 45, and deenergization of the magnets will permit the springs to move the strips away from the magnets. Use of alternating current in the magnets will effect a rapid flexing of the flat springs 45 in a direction longitudinally of the chutes, thereby effecting longitudinal vibration of said chutes, which vibration will move the pellets to and through the open ends 35 of the chutes.

A microswitch 57 is mounted on each chute adjacent the open end thereof with a switch arm 58 extending longitudinally of the chute and beyond the open end thereof, whereby each pellet dropping from the end of the chute will strike the arm 58 and actuate the switch 57 to close the circuit momentarily, because removal of the weight of the pellet from the arm 58 allows the arm to return to open the switch. Therefore the switch will provide for closing a circuit to a counting and control mechanism each time a pellet is discharged from the chute.

A portion or all of the hot or cold liquid needed in the processing machine 1 is bypassed through a duct 59 communicating with the pipe 2. The duct 59 terminates as at 60 immediately above and in alignment with the funnel-shaped inlet 31 of the grinder or is otherwise suitably connected to said inlet, and the flow through the duct 59 is controlled by a suitable valve 61 such as a solenoid-operated valve.

Quantity controls 62, 63, 64 and 65 are arranged in the control box 13 and electrically connected with the switches 57 of the hoppers 20, 21, 22 and 23 respectively. Each of said controls is provided with an indicator 66 for showing the required number of pellets of the ingredient in the respective hopper needed for the mix in the processing machine. Also each control has an indicator 67 which is a form of switch such as is illustrated in Patent No. 1,794,762, issued March 3, 1931, which makes a circuit in all positions except zero position where the circuit is interrupted. The indicator is turned to the number shown by the indicator 66, and effects an electrical circuit to the respective control and when the machine is in operation each time a pellet dropping on the respective switch arm actuates the switch 57 effecting a current impulse to the respective control, the mechanism of the respective control in response to the current impulses causes the indicator 67 to move back one unit. This continues until the indicator 67 reaches zero, at which time current to the respective electromagnets is interrupted to stop feed of pellets from the chute of the respective hopper under control of the control instrument.

A conventional timer switch mechanism 68 such as disclosed in Patent No. 1,795,969, issued March 10, 1931, which has a clock adapted to be set for operation for a desired time interval and operating the switch to interrupt a circuit at the end of said time interval, is electrically connected to the valve 61 so the valve will open when the apparatus is started to operate and will continue for a sufficient time for all of the pellets required to pass through the grinder, the liquid preferably continuing thereafter sufficiently to flush any of the ground ingredients from said grinder, the liquid flow and the grinder preferably stopping at the same time.

In operating an apparatus constructed as described as for mixing dough, various ingredients in pellet form are placed in the respective hoppers. The indicator 66 on the respective controls are adjusted to show the desired quantity of each ingredient pellet for the dough mix. The liquid timer is then set for the desired time of operation of the apparatus. The indicators 67 are then moved to the desired quantity of pellets from each hopper as shown by the indicators 66. The desired amount of flour is placed in the dough mixer 1 and said mixer started to operate. The valve 3 is then opened to start the flow of the desired quantity of liquid to the mixer. The electrical apparatus in the pellet apparatus 5 is connected to a suitable source of electrical energy by operating a switch button 69, a signal light 70 connected in series circuit with the switch 69 indicating when current is available. The switch 71 is connected through the timer switch 68 to motor 30 and valve 31. The starting switch button 71 is then pressed to complete the circuit to the motor 30 to operate the grinder and to the various controls. The timer having been set to a predetermined time closing the contacts of the switch thereof calls for liquid and completes the circuit for energization of the solenoid valve 61 to open same for flow of a portion of the needed liquid to the grinder. The indicators 67 having been set for the desired number of pellets closing the contacts of the respective switches thereof and said switches are connected to the respective electromagnets 54 to thereby effect energization of the electromagnets 54 of the respective ingredient hoppers to vibrate the chutes to cause the pellets to roll toward the open ends 35 thereof and drop into the grinder. Each pellet dropping from a chute actuates the respective switch 57 to count the pellets by moving the respective indicator 67 back one unit. As the pellets are dropped into the grinder, they are ground thereby into the liquid flowing from the duct 59. As the pellets are substantially pulverized in the grinder, the ingredient is dissolved in the liquid and moved therewith through the outlet 32 and duct 32' and forced by the pump 33 into the T fitting 33' for delivery into the dough mixer 1 with the other liquid flowing through the pipe 2.

The operation for feeding the pellets to the grinder is continued and when one of the indicators 67 reaches zero the circuit is broken to the respective electromagnet 54 to stop vibration of the respective chute and thereby stop feed of pellets therefrom. The other chutes will continue to vibrate and feed pellets until their respective controls indicate that the required number of the respective ingredient pellets have been fed to the grinder, then the feed of that pellet is stopped. The feed of pellets from all the hoppers may be simultaneous. The liquid timer will cause continued flow of liquid shortly after the last pellet is fed to the grinder, then the valve 61 is closed and the motor 30 stopped. After sufficient liquid is delivered to the mixer the valve 3 is closed and the mixer continued in operation until the dough is properly mixed.

With this method of introducing various ingredients to the dough mixer, said ingredients are pulverized and substantially dissolved in the liquid, thereby aiding in dispersal of the ingredients through the mix. Also the actual metering and delivery of the various ingredients is done in a manner which substantially eliminates error.

What we claim and desire to secure by Letters Patent is:

1. In an apparatus for introducing dry ingredients into a processing machine using liquid in the processing, a supply of pellets of ingredients, a grinder having an outlet communicating with the processing machine, a chute from the pellet supply to the grinder, means vibrating said chute to effect movement of pellets from the supply to the grinder one at a time, means responsive to feed of pellets to the grinder for counting said pellets, means delivering a stream of liquid to the grinder whereby the pellets are ground into the liquid and the ingredients carried thereby to the processing machine, and control means responsive to the pellet counting means for stopping the vibration of the chute and feed of the pellets to the grinder when a predetermined number of pellets has been fed thereto.

2. In an apparatus for introducing dry ingredients into a processing machine using liquid in the processing, a plurality of hoppers containing pellets of ingredients, said hoppers having depending discharge spouts, a grinder for such pellets having an outlet communicating with the processing machine, said grinder having an inlet opening, chutes having inlet ends under the respective hopper discharge spouts and outlet ends over the inlet opening of the grinder, means in the chutes guiding the pellets in a line toward the outlet end thereof, vibrating means connected with the chutes for vibrating same and effecting movement of the pellets toward and out of the outlet ends of the chutes, means responsive to discharge of the pellets from the chutes for counting the pellets delivered to the grinder, means delivering a stream of liquid into the inlet of the grinder whereby the pellets are ground into the liquid and moved therewith through the grinder outlet to the processing machine, and control means responsive to the pellet counting means for stopping the chute vibrating means when a predetermined number of pellets has been discharged from the respective chutes.

3. In an apparatus for introducing dry ingredients into a processing machine using liquid in the processing, a plurality of hoppers containing pellets of ingredients, said hoppers having depending discharge spouts, a grinder for such pellets having an outlet communicating with the processing machine, said grinder having an inlet opening, chutes having inlet ends under the respective discharge spouts and outlet ends over the inlet opening of the grinder, electromagnetic means effecting longitudinal vibration of the chutes for moving the pellets toward and out of the outlet ends of the chutes, means responsive to discharge of pellets from the chutes for counting the pellets delivered to the grinder, means delivering a stream of liquid into the inlet of the grinder whereby the pellets are ground into the liquid and moved therewith through the grinder outlet to the processing machine, and control means responsive to the pellet counting means for de-energizing and stopping the electromagnetic means and thereby stopping feed of the pellets when a predetermined number of pellets has been discharged from the respective chutes.

4. In an apparatus for introducing dry ingredients into a processing machine using liquid in the processing, a plurality of hoppers containing pellets of ingredients, said hoppers having depending discharge spouts, a grinder for such pellets having an outlet communicating with the processing machine, said grinder having an inlet opening, chutes having inlet ends under the respective discharge spouts and outlet ends over the inlet opening of the grinder, means adjustably supporting the chutes for adjusting the slope of same, vibrating means connected with the chutes for vibrating same and moving the pellets toward and out of the outlet ends of the chutes, means in the chutes guiding the pellets in a line toward the outlet ends thereof, means responsive to discharge of pellets from the chutes for counting the pellets delivered to the grinder, means delivering a stream of liquid into the inlet of the grinder whereby the pellets are ground into the liquid and moved therewith through the grinder outlet to the processing machine, and control means responsive to the pellet counting means for stopping the vibrating means and thereby stopping feed of the pellets when a predetermined number of pellets has been discharged from the respective chutes.

5. In an apparatus for introducing dry ingredients into a processing machine using liquid in the processing, a plurality of hoppers containing pellets of ingredients, said hoppers having depending discharge spouts, a grinder for such pellets having an outlet communicating with the processing machine, said grinder having an inlet opening, chutes having inlet ends under the respective discharge spouts and outlet ends over the inlet opening of the grinder, resilient means supporting the chutes for longitudinal movement, means adjustably supporting the resilient means for adjusting the slope of the chutes, electromagnetic means effecting longitudinal vibration of the chutes for moving the pellets toward and out of the outlet ends of the chutes, means in the chutes guiding the pellets in a line toward the outlet ends thereof, means responsive to discharge of pellets from the chutes for counting the pellets delivered to the grinder, means delivering a stream of liquid into the inlet of the grinder whereby the pellets are ground into the liquid and moved therewith through the grinder outlet to the processing machine, and control means responsive to the pellet counting means for deenergizing and stopping the electromagnetic means and thereby stopping feed of the pellets when a predetermined number of pellets has been discharged from the respective chutes.

References Cited in the file of this patent

UNITED STATES PATENTS

| | | |
|---|---|---|
| 1,790,347 | Hawkins | Jan. 27, 1931 |
| 1,983,319 | Simpson | Dec. 4, 1934 |
| 2,073,567 | Sciarra | Mar. 9, 1937 |
| 2,186,652 | Orth et al. | Jan. 9, 1940 |
| 2,255,704 | Hansen | Sept. 9, 1941 |
| 2,342,116 | Broekhuysen | Feb. 22, 1944 |
| 2,632,707 | Battiste | Mar. 24, 1953 |